United States Patent
Martin et al.

(10) Patent No.: US 7,370,054 B1
(45) Date of Patent: May 6, 2008

(54) METHOD AND APPARATUS FOR INDEXING A HASH TABLE WHICH IS ORGANIZED AS A LINKED LIST

(75) Inventors: Paul A. Martin, Arlington, MA (US); Victor Luchangco, Arlington, MA (US); Jan-Willem Maessen, Somerville, MA (US)

(73) Assignee: Sun Microsystems, Inc, Santa Clara, CA (US)

( * ) Notice: Subject to any disclaimer, the term of this patent is extended or adjusted under 35 U.S.C. 154(b) by 462 days.

(21) Appl. No.: 10/880,797

(22) Filed: Jun. 29, 2004

Related U.S. Application Data

(63) Continuation of application No. 10/674,942, filed on Sep. 29, 2003, now Pat. No. 7,287,131.

(51) Int. Cl.
*G06F 7/00* (2006.01)
*G06F 17/00* (2006.01)

(52) U.S. Cl. ............... 707/100; 707/101; 707/104.1
(58) Field of Classification Search ............... 707/100, 707/101, 104.1
See application file for complete search history.

(56) References Cited

U.S. PATENT DOCUMENTS

| | | | | |
|---|---|---|---|---|
| 5,671,446 A | * | 9/1997 | Rakity et al. ............... | 710/54 |
| 5,960,434 A | * | 9/1999 | Schimmel ............... | 707/100 |
| 6,067,547 A | * | 5/2000 | Douceur ............... | 707/100 |
| 6,654,773 B2 | * | 11/2003 | Hills ............... | 707/206 |
| 2001/0042204 A1 | * | 11/2001 | Blaker et al. ............... | 713/165 |
| 2004/0107227 A1 | * | 6/2004 | Michael ............... | 707/206 |

OTHER PUBLICATIONS

Maged, Michael M., "High Performance Dynamic Lock-Free Hash Tables and List-Based Sets." Aug. 2002, ACM Press.*
Shalev, Ori and Nir Shavit, "Split-Ordered Lists: Lock-Free Extensible Hash Tables." Jul. 13-16, 2003 ACM Press.*
Harris, Timothy L., "A Pragmatic Implementation of Non-Blocking Linked-Lists." Oct. 2001, Proceedings of the 15th International Symposium on Distributed Computing.*
Publication entitled "Concurrent Set Manipulation Without Locking", by Vladimir Lanin et al., 7th ACM Symposium on the Principles of Database Systems, pp. 211-220, Mar. 1988.
Publication entitled "DCAS-Based Concurrent Deques", by Ole Agesen et al., 12th Annual ACM Symposium on Parallel Algorithms and Architectures, Jul. 2000.

(Continued)

*Primary Examiner*—Sam Rimell
*Assistant Examiner*—Jared M Bibbee
(74) *Attorney, Agent, or Firm*—Park, Vaughan & Fleming LLP

(57) ABSTRACT

One embodiment of the present invention provides a system that implements a hash table that is fully dynamic and lock-free. During a lookup in the hash table the system first uses a hash key to lookup a bucket pointer in a bucket array. Next, the system follows the bucket pointer to a data node within a linked list that contains all of the data nodes in the hash table, wherein the linked list contains only data nodes and at most a constant number of dummy nodes. The system then searches from the data node through the linked list to locate a node that matches the hash key, if one exists.

30 Claims, 10 Drawing Sheets

OTHER PUBLICATIONS

Publication entitled "Dynamic Lock-Free Deques Using Single-Address Double-Word CAS", by Maged M. Michael, Annual ACM Symposium on Principles of Distributed Computing Proceedings of the twenty-first annual symposium on Principles of distributed computing, session 1, pp. 24-30, 2002, ISBN:1-58113-485-1.

Publication entitled "A Lock-Free Mechanism for Supporting Dynamic-Sized Data Structures", Maurice Herlihy et al., Proceedings of the Twenty-Second Annual ACM SIGACT-SIGOPS Symposium on Principles of Distributed Computing (PODC), Jul. 2003.

Publication entitled "Trie Hashing With Controlled Load", by Witold A. Litwin et al., IEEE Transactions on Software Engineering, vol. 17, No. 7, Jul. 1991.

Publication entitled "Split-Ordered Lists—Lock-free Resizable Hash Tables", by Ori Shalev et al., Proceedings of the Twenty-Second ACM Symposium on Principles of Distributed Computing, pp. 102-111, Jul. 13-16, 2003, Boston Massachusetts.

Publication entitled "The Repeat Offender Problem: A Lock-Free Mechanism for Supporting Dynamic-Sized Data Structures", by Maurice Herlihy et al., SUN Microsystems, Inc., Report TR-2002-112, Jul. 2002.

Publication entitled "A Pragmatic Implementation of Non-Blocking Linked-Lists", by Timothy L. Harris, Proceedings of the 15th International Symposium on Distributed Computing, Oct. 2001, pp. 300-314.

Publication entitled "Non-Blocking Algorithms and Preemption-Safe Locking on Multiprogrammed Shared Memory Multiprocessors", by Maged M. Michael, Journal of Parallel and Distributed Computing 51(1), pp. 1-26, 1998.

Publication entitled "Using Local-Spin k-Exclusion Algorithms to Improve Wait-Free Object Implementations", by James H. Anderson et al., The University of North Carolina and University of Pittsburgh, Nov. 1995, revised 1996.

Publication entitled "Lock-Free Linked Lists Using Compare-and-Swap", by John D. Valois, Renssealaer Polytechnic Institute, Annual ACM Symposium on Principles of Distributed Computing, pp. 214-222, ISBN 0-89791-710-31995 valoisj@cs.rpi.edu.

Publication "Trie Hashing", by Witold Litwin, I.N.R.I.A. 78-153 Le Chesnay, France, 1981, International Conference on Management of Data, pp. 19-29, ISBN 0-89791-040-0.

Publication "Non-Blocking Timeout in Scalable Queue-Based SpinLocks" by Michael L. Scott, Dept. of Computer Science, Univeristy of Rochester, Rochester, NY 14627-0226, Feb. 2002, scott@cs.rochester.edu www.cs.rochester.edu/u/scott/synchronization/.

Publication "Practical Implementations of Non-Blocking Synchronization Primitives", by Mark Moir, Dept. of Computer Science, University of Pittsburgh, Annual ACM Symposium on Principles of Distributed Computing, 1997, pp. 219-229. moir@cs.pitt.edu.

Publication "Skiplist-Based Concurrent Priority Queues" by I. Lotan of Stanford University and N. Shavit of Sun Microsystems Laboratories, http://ipdps.eece.unm.edu/2000/papers/shavit/pdf.

Publication "Concurrent Maintenance of Skip Lists" by William Pugh, Institute of Advanced Computer Studies, University of Maryland, Computer Science Technology Report Series, Apr. 1989, revised Jun. 1990.

Publication "Non-Blocking k-Compare-Single-Swap" by Victor Luchangco Sun Microsystems Laboratories and Nir Shavit School of Computer Sciences Tel Avis University, shanir@cs.tau.ac.il http://research.sun.com/people/moir/Papers/p004-luchangco.pdf.

* cited by examiner

Shalev-Shavit
(PRIOR ART)

(with proportional indexing)

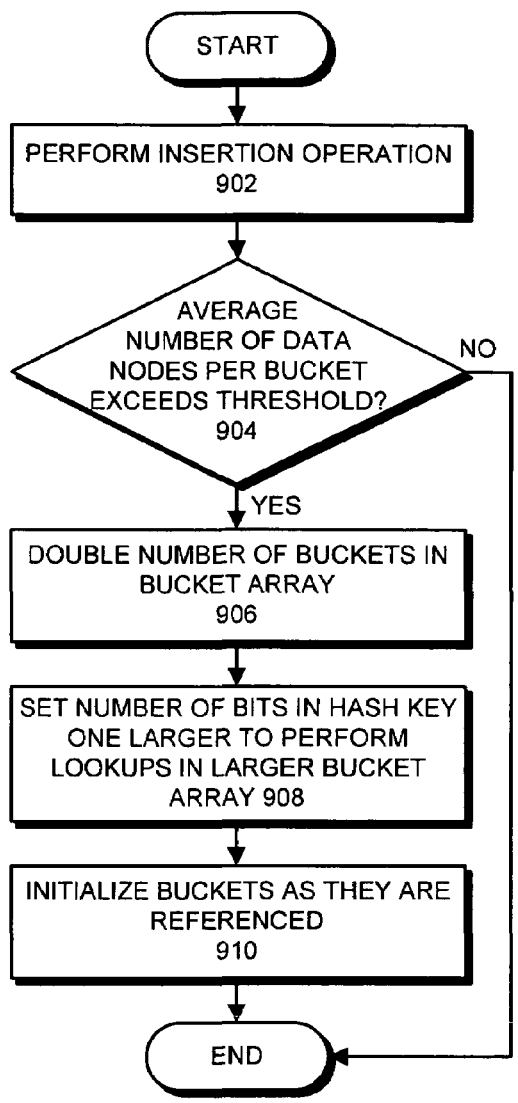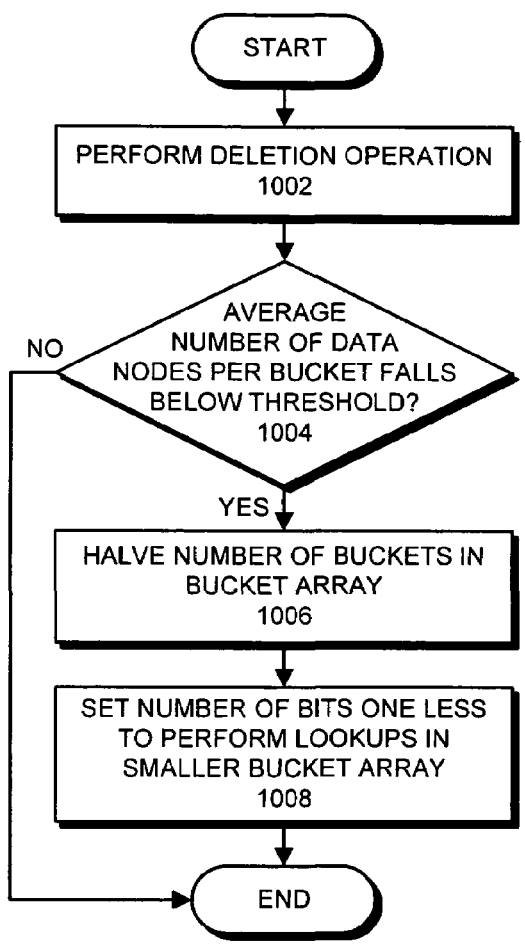
FIG. 9
FIG. 10

METHOD AND APPARATUS FOR INDEXING A HASH TABLE WHICH IS ORGANIZED AS A LINKED LIST

RELATED APPLICATION

This application is a continuation of, and hereby claims priority under 35 U.S.C. §120 to, a U.S. patent application entitled, "Method and Apparatus for Implementing a Fully Dynamic Lock-Free Hash Table," by inventors Paul A. Martin, Victor Luchangco and Jan-Willem Maessen, Ser. No. 10/674,942, filed 29 Sep. 2003 now U.S. Pat. No. 7,287,131.

BACKGROUND

1. Field of the Invention

The present invention relates to the design of lookup structures within computer systems. More specifically, the present invention relates to a method and apparatus for implementing a fully dynamic lock-free hash table.

2. Related Art

Linear hash tables are commonly used to provide fast lookups for computer systems and computer applications. A linear hash table includes an array of buckets, which is occasionally resized so that on average each bucket holds an expected constant number of elements. This ensures that common hash table operations, such as insert, delete and search, require an expected constant time. For example, hash table 100 in FIG. 1 includes a bucket array 102, wherein each bucket, such as bucket 104, includes a pointer, such as pointer 110, to a linked list of data nodes. In order to resize hash table 100 when the buckets become too full, each of the data nodes is typically "rehashed" into a larger bucket array.

The design of such hash tables becomes more complicated in a multi-threaded environment, because concurrently executing threads can potentially interfere with each other while performing operations on the same hash table. In order to prevent such interference, some hash table implementations use locks to prevent different threads from interfering with each other.

However, using locks can create performance problems. Locking an entire hash table can create a performance bottleneck because threads may have to wait for other threads to complete their hash table operations before obtaining access to the hash table. To mitigate this problem, some concurrent hash table implementations make use of multiple locks, which are associated with portions of the hash table. For example, if a hash table has N buckets, a different lock can be associated with each of the N buckets. This allows multiple threads to access different buckets in the hash table at the same time. However, in order to resize the hash table into a different number of buckets, the system has to first collect multiple locks, which can be extremely time-consuming process. During the resizing process, all other operations dependent on these locks are prevented from making progress.

Because of the performance problems that arise from locks, a number of researchers have been developing lock-free data structures that operate efficiently in a multi-threaded environment.

Harris describes a way to build and modify a linked list that is lock-free and can be constructed using only load-linked (LL)/store-conditional (SC) or compare-and-swap (CAS) instructions (see Timothy L. Harris, "A Pragmatic Implementation of Non-Blocking Linked-Lists," *Proceedings of the 15th International Symposium on Distributed Computing,* October 2001, pp. 300-14). The Harris list forms the basis of the two state-of-the-art lock-free hash tables described below.

The dynamic lock-free hash table by Michael is set up with a bucket array of a chosen size and an empty set of data nodes (see Maged M. Michael, "High Performance Dynamic Lock-Free Hash Tables and List-Based Sets," *The 14th Annual ACM Symposium on Parallel Algorithms and Architectures,* pages 73-82, August 2002). In the hash table of Michael, data nodes are added to the linked lists associated with each bucket, and can be deleted when they are no longer wanted in the hash table. Unfortunately, if the hash buckets get to be "too full", there is no way described to increase the number of buckets to reduce the average load. (Michael uses a slightly simpler variant of the Harris linked-list as the underlying structure to store the data nodes for each bucket.)

The split-list hash table by Shalev and Shavit is able to grow by doubling the size of the buckets table up to a pre-allocated limit (see Ori Shalev and Nir Shavit, "Split-Ordered Lists—Lock-free Extensible Hash Tables," *Proceedings of the Twenty-Second ACM Symposium on Principles of Distributed Computing,* pages 102-111, Jul. 13-16, 2003, Boston, Mass.). This doubling involves adding a new "usable" segment that is as big again as the part already in use, and filling it with "uninitialized" values so that references to these new buckets will set themselves up properly, as described below. Their key improvement is that the data nodes of the table are maintained in a single long linked-list (such as Harris') and do not need to be moved when the number of hash buckets changes (see FIG. 2A). This innovation requires using a special hash function similar to a design by Litwin et al. that orders the buckets to permit recursive splitting of the list (see Withold A. Litwin, "Linear Hashing: A New Tool for File and Table Addressing", *Proceedings of the Sixth Conference on Very Large Data Bases,* 1980, pages 212-223). The recursive splitting of the hash buckets means that every bucket (except the $0^{th}$ one) has a "parent" bucket that is in some sense twice as coarse in dividing up the linked list.

The proper setup for Shalev-Shavit buckets is to have each bucket that has been referenced during a hash table operation point to a permanent dummy node in the otherwise-dynamic linked list that holds all the data nodes (see FIG. 2A). These dummies are assigned special hash keys, which are designed to fall in between the hash keys that are possible for real data nodes.

The dummy nodes serve as place holders so that entering the linked list by way of the hash bucket will always provide a pointer to a dummy node that is at the head of the region associated with that portion of the hash mapping. Once a bucket pointer has been initialized with a pointer to the corresponding dummy node, it does not change.

These dummy nodes are essential to the correctness of the Shalev-Shavit hash table and can never be deleted. Their algorithm also offers no way to reduce the size of the bucket array. Consequently, as a hash table grows it may add many dummy nodes, but as its contents are deleted the dummy nodes must remain, leaving, in some cases, a large structure of buckets and dummies with very little actual data remaining.

Additionally, the sharing of bucket array elements as the bucket table grows dictates that the space for the growing segments of the bucket array must be pre-allocated sequentially with the initial portions, so that the space taken by the bucket array at all times is effectively the space it will take when it has reached the maximum size supported. This is an expensive overhead when the "live" portion of the array space is a small portion of the allocation, and, more seriously, it puts a limit that must be set initially on the ultimate size the bucket array may ever reach.

A later addendum to the Shalev-Shavit hash table uses additional indirection to ease this problem. It allocates a table of pointers to bucket table segments, and allocates the actual segments upon demand. This scheme reduces the bucket table overhead, but the pointer table is fixed size and must be pre-allocated, and any segment ever used must be retained.

Hence, what is needed is a method and apparatus for implementing a fully dynamic lock-free hash table without the overhead involved in having to maintain a large number of buckets and dummy nodes. By fully dynamic we mean a data structure wherein the space consumed is proportional to the number of items actually in the hash table at any time.

SUMMARY

One embodiment of the present invention improves on the Shalev/Shavit by allowing the size of the bucket array to grow or shrink without requiring initial allocation of storage to support the maximum size, and allows dummy nodes that are no longer needed (due to shrinking the bucket array size) to be safely deleted.

Another embodiment functions without requiring dummy nodes in the linked list of data nodes. During a lookup in the hash table, the system first uses a hash key to find a bucket pointer in a bucket array. Next, the system follows the bucket pointer to a data node within a linked list that contains all of the data nodes in the hash table, wherein the linked list contains only data nodes and no dummy nodes. The system then searches from the data node through the linked list to locate a node that matches the hash key, if one exists.

Deleting the data node from the linked list can involve using an atomic operation to mark the data node as dead, and then a second atomic operation updating the next pointer of the predecessor of the data node to point around the data node to the successor of the data node in the linked list. (Note that the atomic operation can include any one of a number of different atomic operations, such as a compare-and-swap operation or a load-linked/store-conditional operation.)

In a variation on this embodiment, deleting the data node from the linked list additionally involves redirecting the next pointer of the deleted data node to become a back pointer that points to the predecessor of the deleted data node. Such redirection operations redirect the bucket pointer to a portion of the data list that falls before the deletion, and this is useful as a search point for this bucket.

In a further variation, if a subsequent search through a chain of nodes from the back pointer does not lead to a live node, the system reinitializes the bucket pointer, using the procedure similar to that used initially to set a bucket pointer. It obtains a "parent" bucket pointer from the bucket array, then searches through the data linked list from a node pointed to by the parent bucket pointer to locate a starting node for the bucket pointer. When such a node is found, the system updates the bucket pointer to point to the predecessor node of the first node that logically belongs in this bucket.

In a variation on this embodiment, deleting the data node from the linked list involves using a modified lock-free reference counting scheme such as the Moir et al. solution to the Repeat Offender Problem to reclaim the data node as soon as no live references to it remain. The Repeat Offender mechanism is described in a paper by Maurice Herlihy, Victor Luchangco and Mark Moir, entitled "The Repeat Offender Problem: A Mechanism for Supporting Dynamic-Sized, Lock-Free Data Structures," *Proceedings of Distributed Computing,* 16*th International Conference, DISC* 2002, Toulouse, France, Oct. 28-30, 2002, pp. 339-353.

In yet a further variation, in order to initialize a bucket pointer, the system first obtains a parent bucket pointer for the bucket pointer. Next, the system searches through the linked list from a node pointed to by the parent bucket pointer to locate a starting node for the bucket pointer. Finally, the system updates the bucket pointer to point to the node immediately before the starting node.

In a variation on this embodiment, the data nodes are stored in the linked list in bit-inverted hash key order. In this variation, doubling the number of buckets in the bucket array involves mapping the old smaller bucket array into the first half of the new larger bucket array.

In a variation on this embodiment, the data nodes are stored in the linked list in hash key order, and the pointers assigned in a bucket table are arranged to point proportionately into this list. In this variation, doubling the number of buckets in the bucket array involves interleaving the working bucket array pointers into the larger allocated bucket array.

In a variation on this embodiment, if the average number of data nodes in each bucket falls below a minimum value, the system halves the number of buckets in the bucket array to form a smaller bucket array. The system subsequently uses one fewer bit from the hash key to perform lookups in the smaller bucket array.

BRIEF DESCRIPTION OF THE FIGURES

FIG. 9 presents a flow chart illustrating how the number of buckets in a hash table is increased in accordance with an embodiment of the present invention.

FIG. 10 presents a flow chart illustrating how the number of buckets in the hash table is decreased in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Split-List Hash Table with Deletable Dummy Nodes

One embodiment of the present invention provides a system that implements a hash table that is fully dynamic and lock-free. It shares the split-ordered list design of using a single linked list for all the data, with dummy nodes (that are deleted when no longer needed) to segment this list. But by substituting a new larger or smaller bucket array for the "old" one, the hash table can grow and shrink without limit as needed by the size requirements of the data. An included operation set covers incrementally moving the bucket pointers from the old array to the new one and deleting the unneeded dummies in the case where the new bucket array is smaller than the old one.

Figure 1:
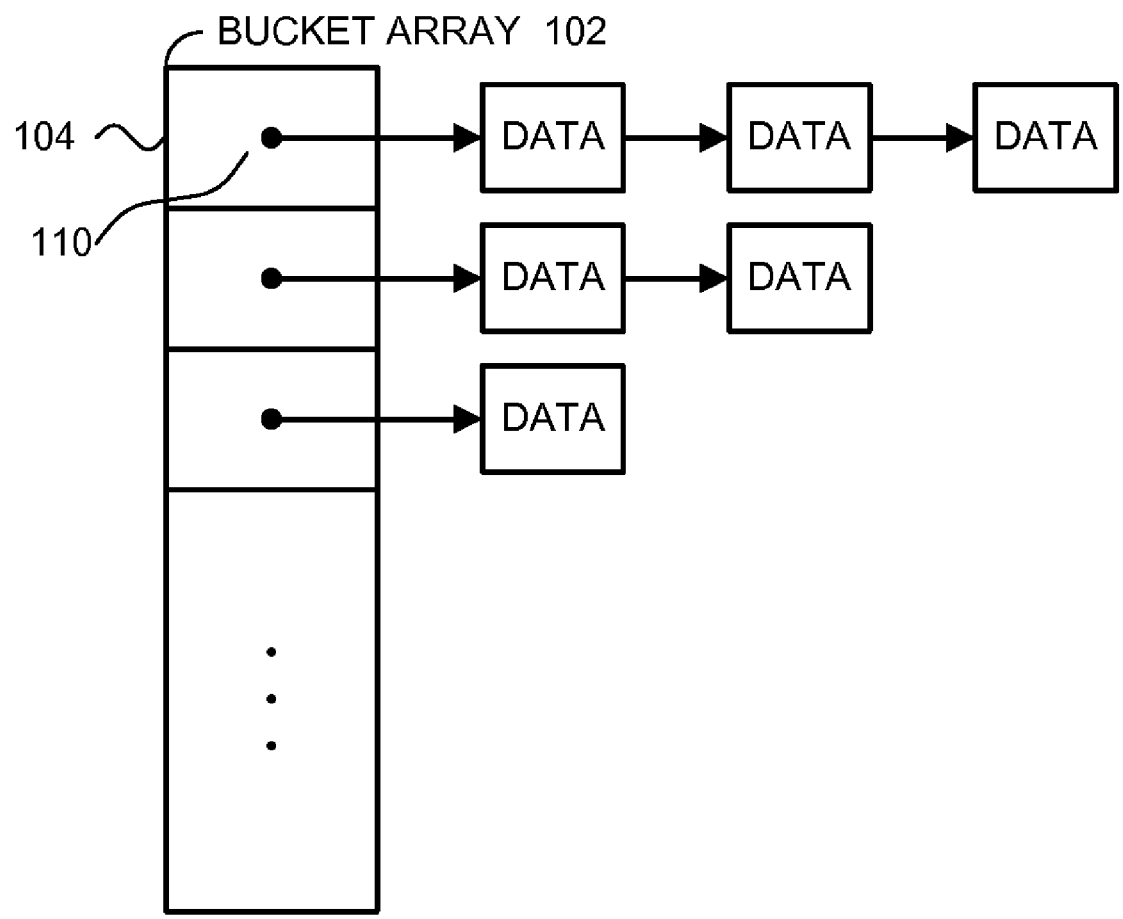
FIG. 1 illustrates a hash table.
Figure 2A:
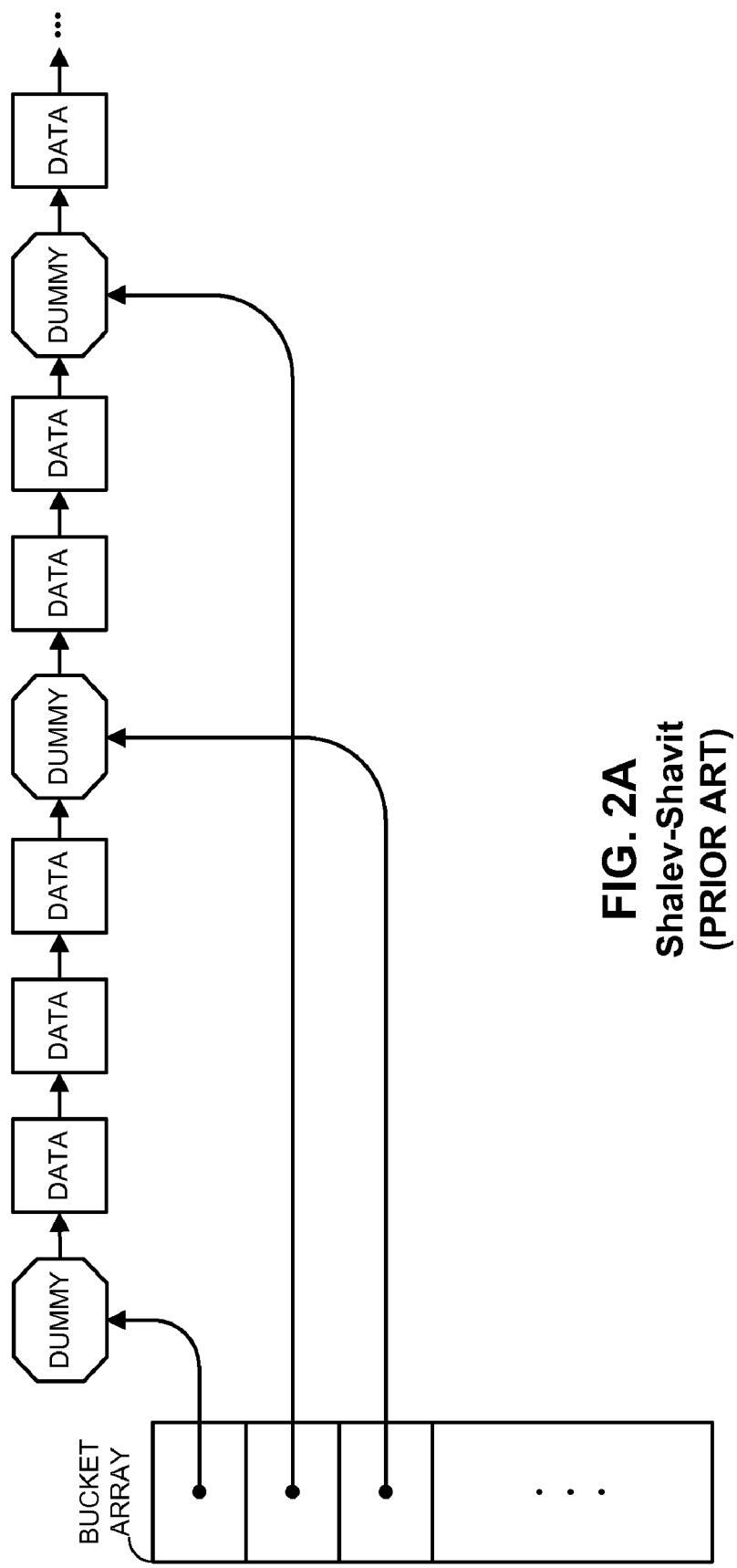
FIG. 2A illustrates a split-ordered list hash table with bit-reversed bucket pointers.
Figure 2B:
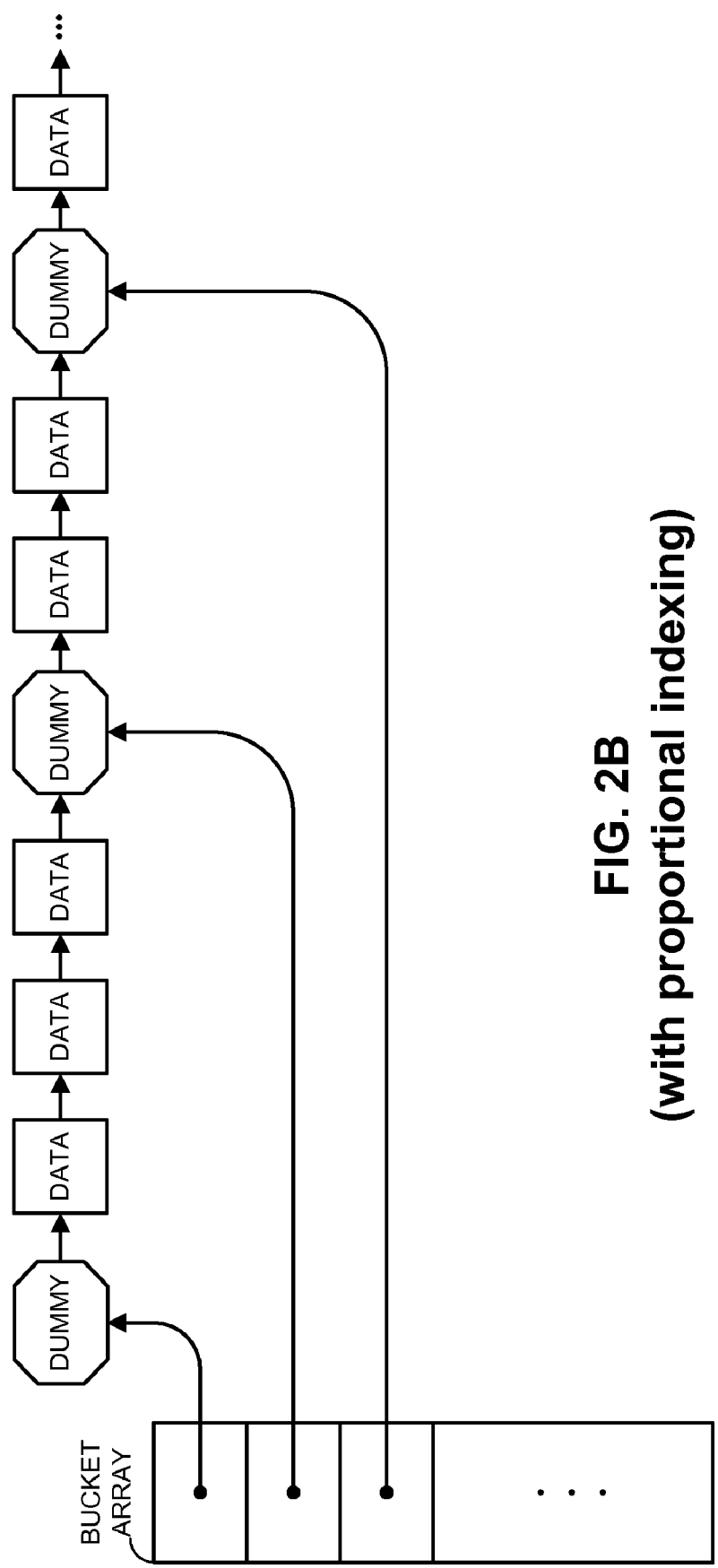
FIG. 2B illustrates a split-ordered list hash table with proportional bucket pointers.
Figure 2C:
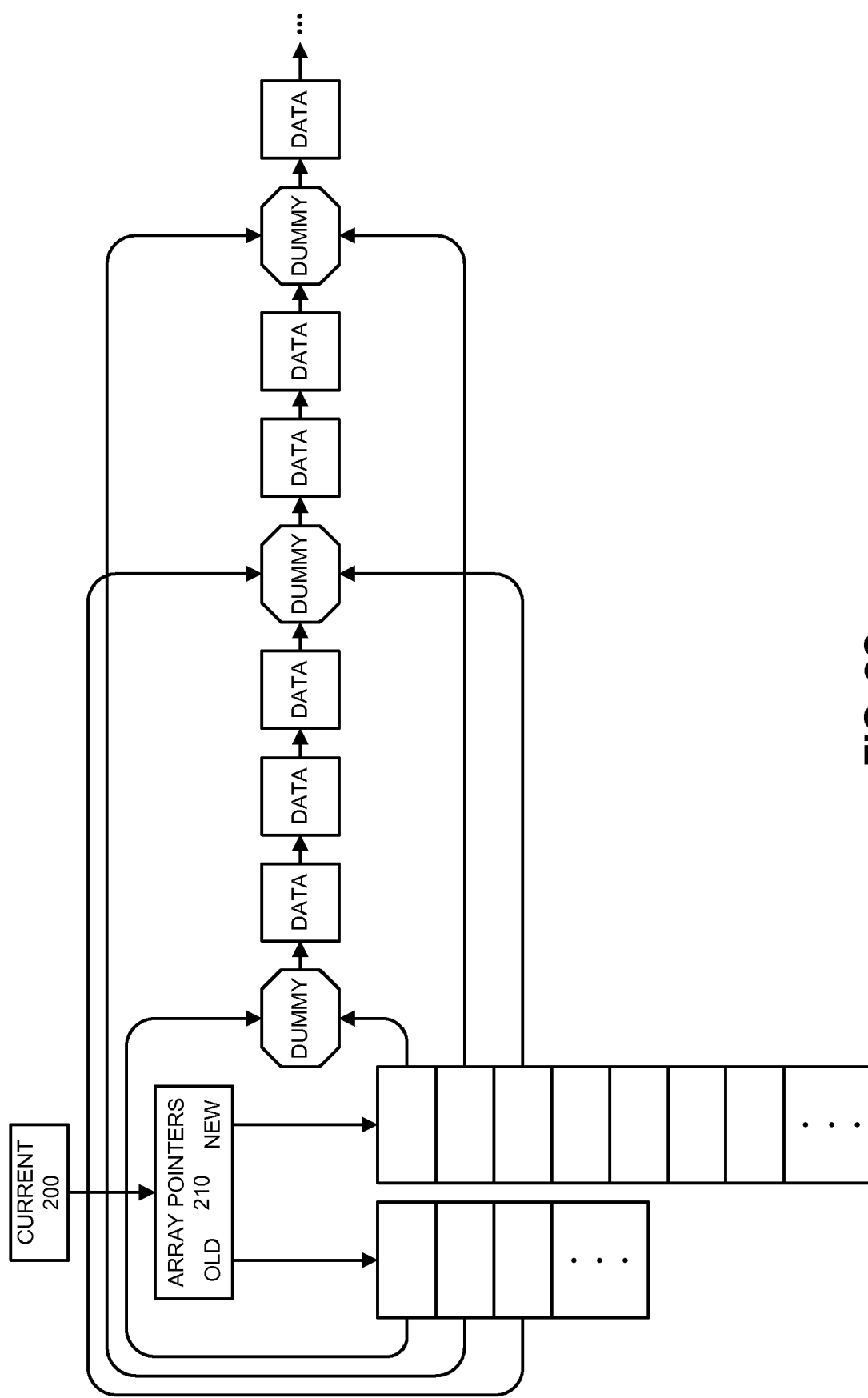
FIG. 2C illustrates a split-ordered list hash table with new/old bucket arrays and deletable dummy nodes in accordance with a bit-reversed indexed embodiment of the present invention.
Figure 2D:
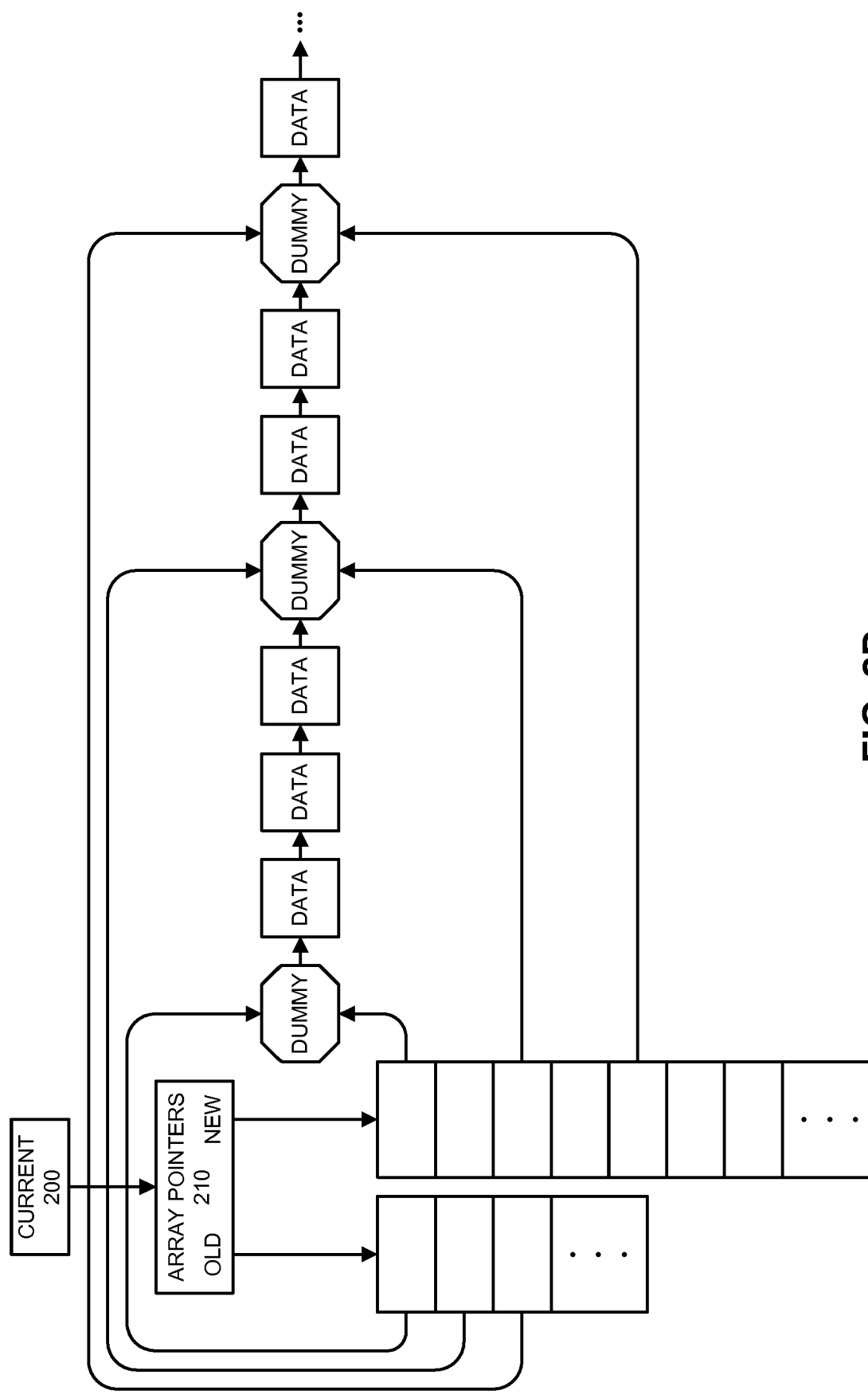
FIG. 2D illustrates a split-ordered list hash table with new/old bucket arrays and deletable dummy nodes in accordance with a proportional indexed embodiment of the present invention.

FIG. 2C illustrates such an embodiment at a stage when the hash table bucket array had been determined to be too small and was replaced by a new one twice as large.

In the above-described embodiment of the present invention, the bucket array is allocated to the size needed initially, and filled with a special "uninitialized" value in all cells except the first one, which is set to point to a dummy node that is the head anchor of the empty list of nodes.

As nodes are added to the hash table, the bucket array is filled in to point to dummy nodes added at locations statistically likely to evenly divide the linked list of the data. When the average number of nodes associated with a bucket becomes excessive, a process creates a new bucket array that is twice as large as the old one, initializes it as described in the previous paragraph, creates a "bucket tables" structure (210 in FIG. 2C) to hold the old array as "old" and the new one as "new", and then atomically switches the "current" pointer (200 in FIG. 2C) of the hash table to the new structure.

Lookups are now done in the new bucket array, and when a cell is found uninitialized the corresponding cell of the old bucket array is copied if there is one and if it has been initialized. If no corresponding bucket from the old array is available, the procedure uses the parent bucket in the new array.

Should the average number of nodes per bucket become too small, a similar action can establish a "bucket tables" structure with the new array half the size of the old one. The same sort of incremental copying moves the bucket pointers from the old bucket array cells to the new one, but when the old array is larger than the new one there is an additional chore to complete; the dummies that are used by the old array but NOT by the new one must be deleted in a manner that ensures that they are all gone before the old array is abandoned.

One way to achieve this dummy deletion is to include in the "bucket tables" structure a pointer to the lowest index in the "old" table of a dummy node that should be deleted but has not yet been deleted. Until this index reaches the end of the bucket table, each hash table operation is "taxed" with attempting to delete the next surplus dummy, and if successful, atomically moving the index to the next potential surplus dummy. It is convenient to set a special "all done" value (such as zero) in this index when no more deletions are needed. None are needed in the initial case where there is no old table, and also whenever the new table is larger then the old one.

This embodiment allows the bucket array to adjust to the optimum size for any given load of the hash table and removes any dummy nodes that are no longer needed to support the hash table structure.

Split-List Hash Table without Dummy Nodes

Figure 3A:
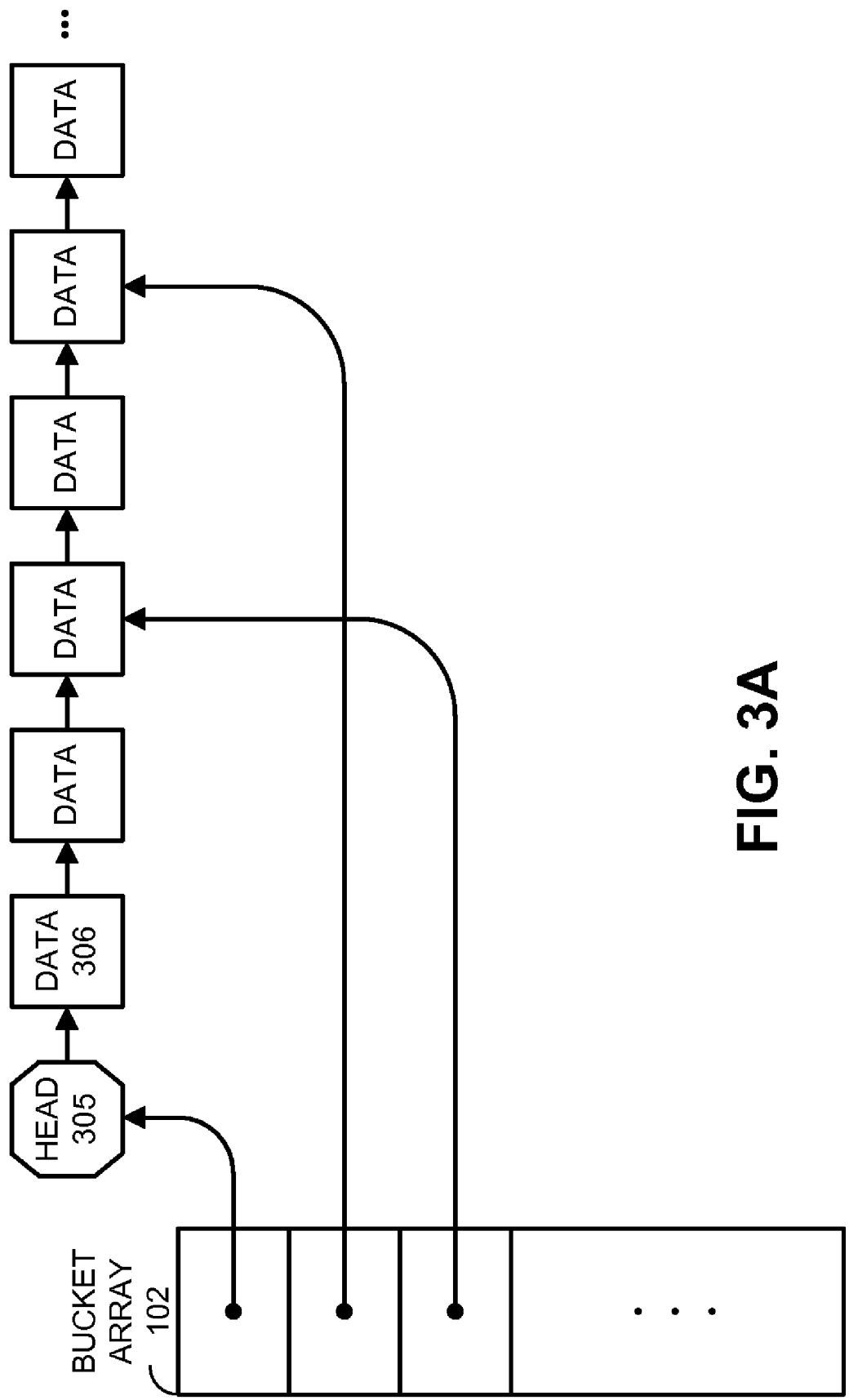
FIG. 3A illustrates a split-ordered list hash table without dummy nodes in accordance with a bit-reversed indexing embodiment of the present invention.
Figure 3B:
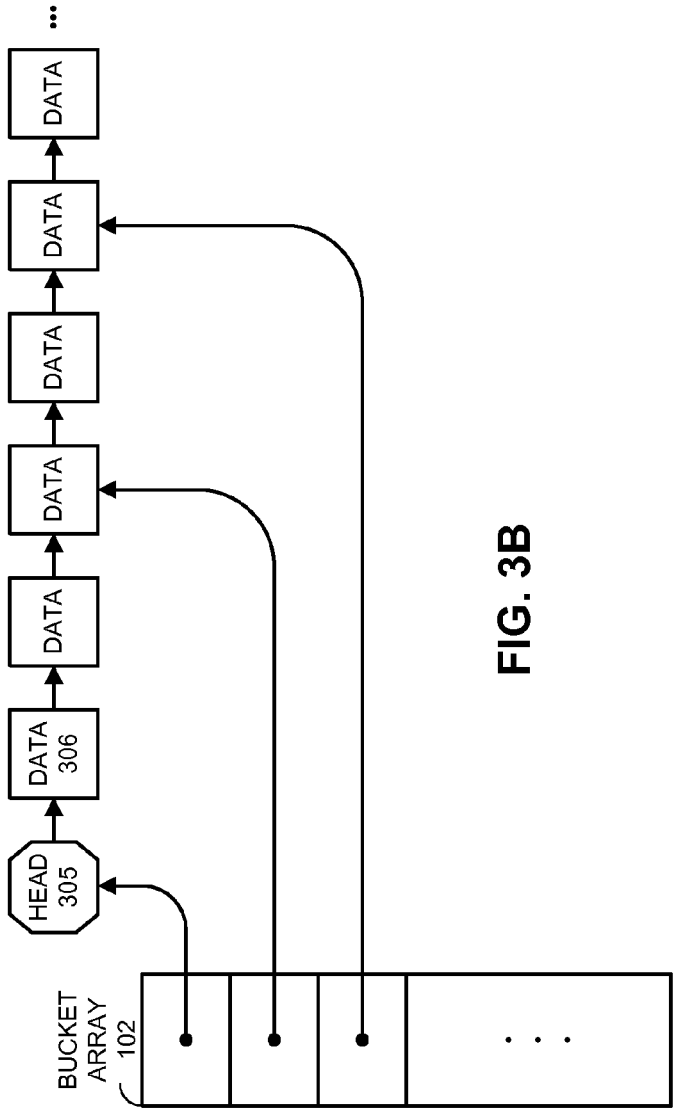
FIG. 3B illustrates a split-ordered list hash table without dummy nodes in accordance with a proportional indexing embodiment of the present invention.

Another embodiment of the present invention improves on Shalev-Shavit by removing the need for dummy nodes as illustrated in FIGS. 3A and 3B. Removing the dummy nodes saves space proportional to the largest number of buckets even used with the hash table. Moreover, it allows arbitrarily large growth instead of requiring that the bucket array be allocated initially for the maximum size it will ever become. It also allows arbitrarily small (the restriction is two or more buckets) bucket tables, thereby freeing the storage used by the hash table in a previous period when it was larger.

Figure 5:
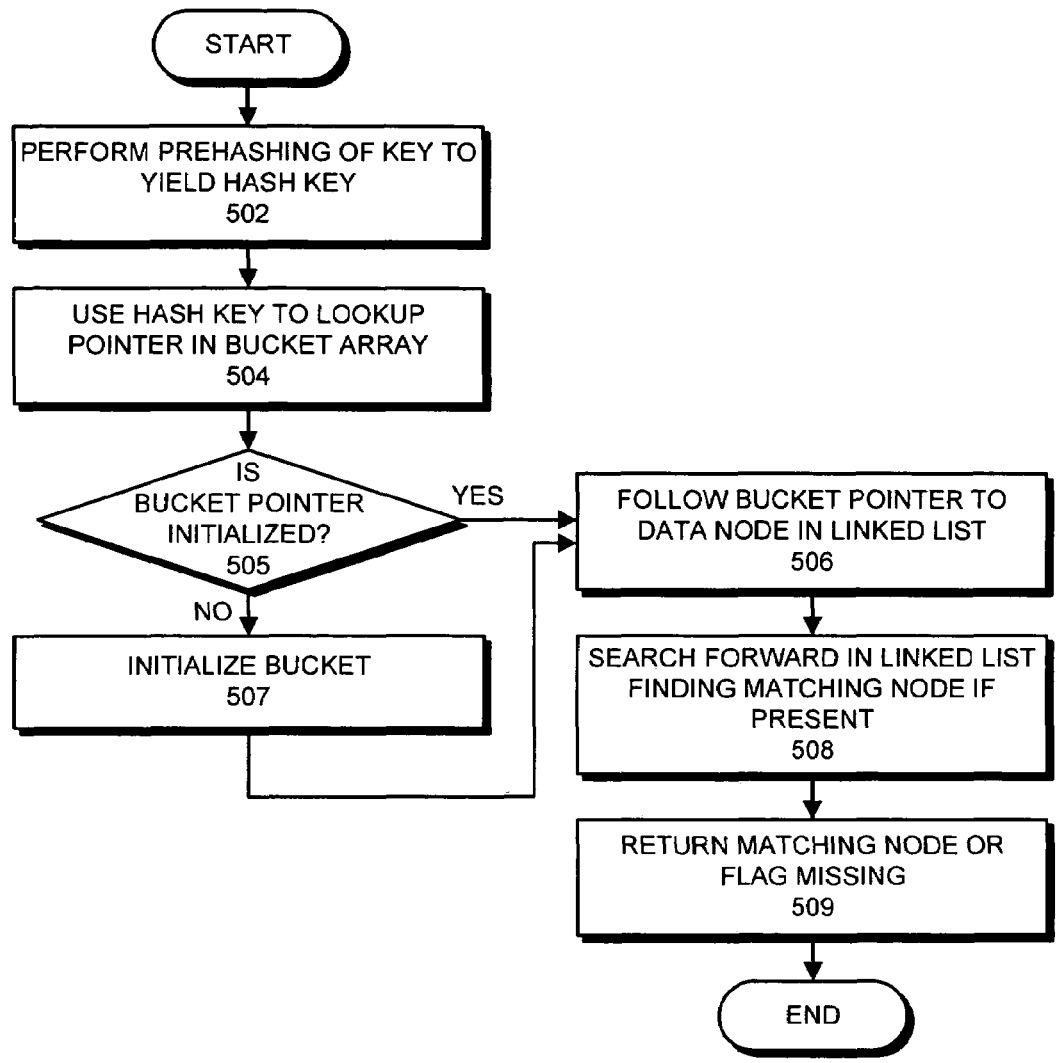
FIG. 5 presents a flow chart illustrating a hash table search operation in accordance with an embodiment of the present invention.

In the above-described embodiment of the present invention, the hash search operation is similar to the hash table search operation described in Shalev/Shavit. Referring to the flow chart in FIG. 5, the system first performs a pre-hashing operation to generate a hash key that achieves a substantially uniform distribution of hash keys over possible hash key values (step 502). Next, the system uses the hash key and the size of the bucket array to lookup a bucket pointer in a bucket array (step 504). The system then determines if the bucket pointer is initialized (step 505). If not, the system (step 507) uses the method portrayed in FIG. 8 to initialize the bucket. Initializing a bucket is a possibly recursive operation; it may require initializing the parent bucket before the bucket can be initialized. Once the bucket is initialized, the system then returns (507) and proceeds to step 506.

Once the bucket pointer is initialized, the system follows the bucket pointer to a data node in the linked list (step 506). Next, the system performs a search starting from the data node to locate a node that matches the hash key, if one exists (step 508). The system then either returns the matching node or reports that the requested node is missing (step 509).

While a system using dummy nodes can arrange to have the dummies fall "between" the real valued nodes, a linked list without dummies must always point the bucket array cells at a real data node that falls before the first real data node that would follow the dummy, had there been one. By treating the bucket pointers as hints that always point before the first data node in the bucket, we can guarantee that a search starting from one will not miss a more recently inserted node.

After any access to the hash table, the bucket pointer used is changed to point to the real data node that has the highest hash key that is LESS than the keys that should be "in" this bucket (if it doesn't already do so). This is the node that would fall just before the dummy in the Shalev/Shavit algorithm. Subsequent additions to the "previous" bucket may add nodes after this one which also belong in the "previous" bucket, so adjusting the bucket pointer is done whenever it no longer points before the first data node of the corresponding bucket.

One embodiment of the present invention modifies the underlying Harris linked list to include backward pointing recovery hints in the nodes that have been deleted. These nodes serve the "permanence" role of the dummy nodes in the Shalev/Shavit hash table, but can be recovered (e.g., garbage collection) instead of remaining forever a part of the hash table.

Node Deletion

The Harris linked list deletes a node by first marking a special DEAD bit that is part of the pointer cell where the NEXT pointer is stored. Once the DEAD bit is set, the node is logically deleted. Keeping this dead bit in the pointer word provides the atomicity needed to allow exactly one process, in one atomic instruction, to claim the node in a way that is public to all other threads, concurrent or subsequent. Once the DEAD bit is set, the process deleting the node can atomically alter the NEXT pointer of the predecessor of the dead node to point around it to the next live node. (Michael's and our use of the Harris list simplifies this—we don't look for a live node but just splice to the node that the deleted one was already pointing to, even if that node is also deleted.) Once the splicing-around step is completed, no live node in the linked list points to the deleted node.

Bucket pointers that point to dead nodes are no longer useful, but a recovery through the "parent" node as in initialization will allow the search to succeed and eventually remove the references to the dead node, allowing the garbage collector or another process to collect the storage it consumes. This approach is simple and effective, but requires a recovery-from-parent step whenever the node that is pointed to by a bucket cell is deleted.

Back-Linked Lists

One embodiment of the present invention uses these dead nodes in one further way; until some thread has spliced the list to point around a dead node, the NEXT pointer of that node is the only source of information to allow other threads to follow the linked list. It is literally holding the list together (in the case where the thread doing the deletion stalls) and so it cannot be altered or removed until the list is spliced around it. But once a node is spliced around, we can use its NEXT pointer for a different purpose—we redirect it back to the previous predecessor node. Thus, a thread that follows this back pointer may quickly find a live node that precedes this node in the list.

Subsequent operations following the next pointer of live nodes will not see this node (it has been spliced around). However, threads that were stalled while it was being deleted may remember it as the NEXT of its (possibly former) predecessor node, and it may be pointed to by one or more bucket pointers.

The thread that finds the node with a backward pointer can tell that the pointer is not a normal forward one—either because an additional BACK bit is set in the pointer word or by comparing the hash key of the node pointed to by the bucket pointer (either stored in the cells or computed on the fly from the real stored value) to the previous one and noting that they are out of order.

Figure 4:
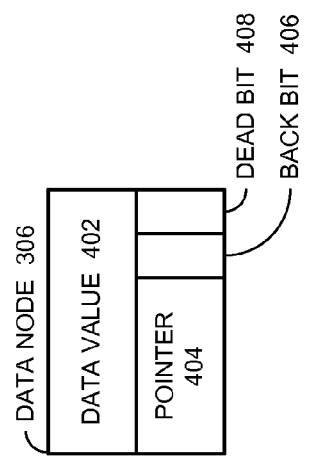
FIG. 4 illustrates a data node in accordance with an embodiment of the present invention.

Referring to FIG. 4, in one embodiment of the present invention, each data node 306 includes a data value 402, as well as a next pointer 404. The two lower order bits of the next pointer can be used as BACK bit 406 to indicate that pointer 404 is a back pointer, and a DEAD bit 408, to indicate that the data node is dead. (The standard addressing modes of modern computers allocate sufficient bits in the address to specify single bytes, and the nodes used in a linked list must be at least bytes long, so there are logically at least two bits available, and the DEAD bit uses just one)

Figure 6:
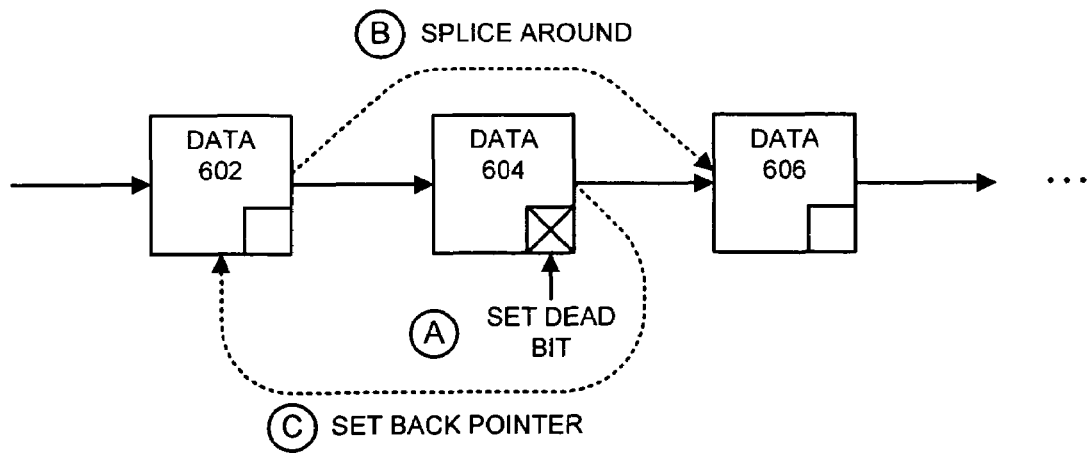
FIG. 6 illustrates a node deletion operation in accordance with an embodiment of the present invention.
Figure 7:
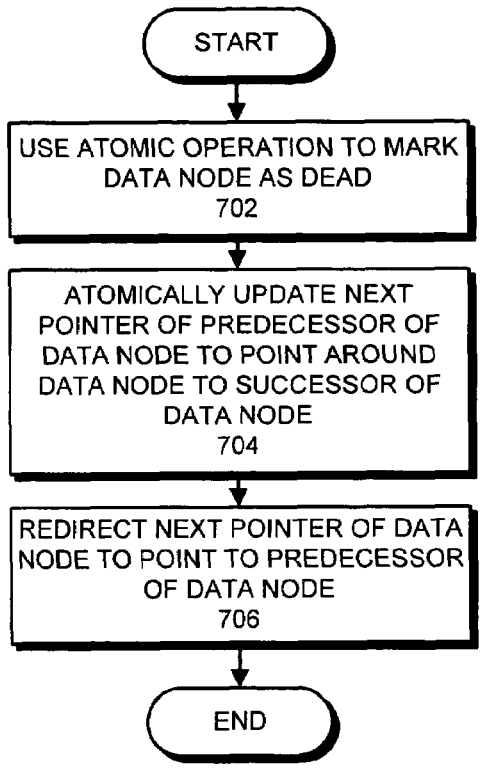
FIG. 7 presents a flow chart of a node deletion operation in accordance with an embodiment of the present invention.

Referring to FIGS. 6 and 7, in one embodiment of the present invention, the system deletes a data node by first using an atomic operation to mark that data node 604 as dead (step A and step 702). Next, the system atomically updates the next pointer of the predecessor 602 of data node 604 to point around data node 604 to the successor 606 of data node 604 (step B and step 704). Finally, the system redirects the next pointer of data node 604 to point to the predecessor 602 of data node 604 (step C and step 706).

Following backwards pointers may eventually encounter a deleted node that is still pointing forward; the deletion process for this node was not "finished". However, the thread following the backward pointer does not have sufficient information to finish the deletion.

Recovering from a Bad Pointer Chain

Figure 8:
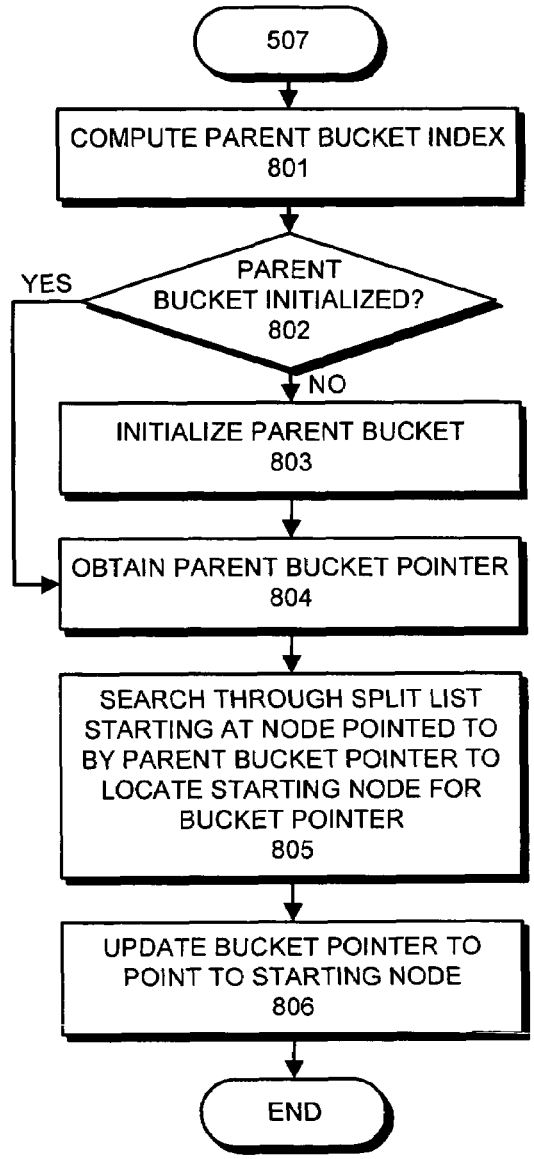
FIG. 8 presents a flow chart illustrating how a bucket pointer is updated or initialized in accordance with an embodiment of the present invention.

The recovery from finding that a backward chain fails to lead to a live node is the same as discovering a bucket pointer is not yet initialized. The process uses the "parent" bucket pointer to find the correct starting point in the split-list, and then updates the "bad" bucket pointer for subsequent use. Referring to FIG. 8, the system first computes the parent bucket index. (step 801). The system then determines if the parent bucket is initialized (step 802). If not, the system initializes the parent bucket (step 803). Next, the system obtains the parent bucket pointer from the parent bucket (step 804). The system then searches through the list starting at the node pointed to by the parent bucket pointer to locate a starting node for the bucket pointer (step 805). (This starting node is the predecessor node of the first node encountered that should fall within the bucket.) The system then updates the bucket pointer to point to the starting node (step 806). Using an atomic update such as CAS blocks stalled threads from writing old values here.

The above-described technique works recursively if the parent bucket is also uninitialized or pointing to a forward-pointing deleted node.

An effective way to use the BACK pointers while avoiding possibly wasting a large amount of effort is to pursue BACK pointers and the recursive parent-based recovery in parallel—take a single step along both recovery paths and stop recovering when either succeeds. Notice that this strategy may lead us to also pursue a chain of back pointers from a deleted node found while following the parent bucket pointer, or its parent bucket pointer, etc. This parallel recovery scheme limits the depth of descent to the minimum caused by either method at the price of multiplying the effort (though still just a constant factor) at each stage.

Shrinking/Growing the no-Dummy Nodes Hash Table

The overall design of the no dummy nodes hash table makes reducing the number of buckets very easy—just reset (CAS) a CurrentSize limit to half the previous size (subject to a minimum size) and set (CAS) a pointer to the high bucket index that needs to be cleaned to "uninitialized" to allow GC (or ROP) to claim the DEAD nodes that may be pointed to by the now-unused buckets. This cleaning work can be farmed out to be done as a side chore by each access to the hash table until all the cleanup is done (producing low delays for all calls) or can just done entirely by the thread that decided to shrink the table.

With deleting dummy nodes, this no-dummy nodes version does not have to wait for completion of the cleanup.

Both growing (described by Shalev/Shavit) and shrinking (described above) assume that the array size allocated for the bucket array is not changed, but this is an unnecessary restriction. By creating a new bucket pointer array that is the new size (say either twice or half the size of the now-christened "old" one), we can remove the limitation to the initially allocated array size. While there is a "new" bucket array, the process is altered to look there first, and if the bucket is not initialized, look in the corresponding bucket of the "old" table, copying its contents if they have been initialized. The switching to a new table is done atomically in a manner similar to the one described for the hash table wherein dummy nodes were deleted upon shrinking the table.

The task of copying the contents of the part of the old table that corresponds to the new one can be handled by a number of methods, since only efficiency, the amount of work that is "taxed" to a given hash table operation, and the overall period of use of the storage are affected—these choices do not impact the correctness of the algorithm.

Referring to FIG. 9, the task of growing the number of buckets in the bucket array is typically triggered by a node insertion operation that adds a data node to the hash table (step 902). The system then determines if the average number of data nodes per bucket exceeds a threshold (step 904). If adding this data node causes the average number of data nodes per bucket to exceed a maximum value, the system increases (typically doubles) the number of buckets in the bucket array (step 906). The system subsequently uses one additional bit from the hash key (in the case of doubling) to perform lookups in the larger bucket array (step 908), and then initializes the buckets as they are referenced during subsequent hash table operations (step 910).

Referring to FIG. 10, the task of shrinking the number of buckets in the bucket array is typically triggered by a node deletion operation that deletes a data node from the hash table (step 1002). The system then determines if the average number of data nodes per bucket falls below a threshold (step 1004). If deleting the data node causes the average number of data nodes per bucket to fall below a minimum value, the system reduces (typically halves) the number of buckets in the bucket array (step 1006). The system subsequently uses one less bit (in the case of halving) from the hash key to perform lookups in the smaller bucket array (step 1008).

Variation on Recursive Split-Ordering

One potential problem with the Shalev/Shavit hash table concerns the use of "recursive split-ordering" to sort the elements in the linked list. The recursive split-ordering is achieved by simple binary bit reversal: reversing the order of the bits of the hash key so that the new keys' most significant bits are those that were originally its least significant. Because every operation of the Shalev/Shavit hash table implementation must search in the linked list of elements, every operation must perform this binary reversal. In addition, every node must store the bit-reversed key, or a bit-reversal must be performed for each node accessed. Reversing bits, while conceptually simple, is not directly supported in most computer hardware, and consequently may be relatively expensive. The best-case cost for performing a bit reversal is bounded by logN for N bits of data.

Shalev and Shavit have described the use of the recursive split-ordering as "the key algorithmic breakthrough" of their hash table algorithm. Because their linked list is kept in recursive split order, using the low-order bits of the original hash key as the index into the bucket array—that is, the function to hash keys into $2^N$ buckets simply takes the remainder of the bit-reversed key after dividing it by $2^N$—causes the keys to be distributed evenly among the buckets. But it also causes the keys in the range $2^k$ to $2^{k+1}$ to be spread evenly sub-dividing the range covered by the keys in the range 0 to $2^k-1$.

Therefore, when the number of buckets is doubled from $2^N$ to $2^{N+1}$, a key that hashed to bucket i in the smaller table hashes to either bucket i or bucket $(i+2^N)$ in the larger table. Thus, the first half (i.e., the half with the smaller numbers) of the new bucket array is just a copy of the old bucket array. Indeed, Shalev and Shavit exploit this property to avoid copying the old array; it becomes just the first half of their new array.

In the code presented by Shalev and Shavit in their paper, there is always sufficient space to avoid copying when increasing the number of buckets because they pre-allocate an array of MAX_TABLE_SIZE potential buckets and do not increase the number of buckets when it would exceed MAX_TABLE_SIZE. This approach restricts the applicability of their algorithm to applications in which a reasonable value for MAX_TABLE_SIZE can be determined ahead of time, and wherein pre-allocating that much storage for a table is acceptable. As we described, it is straightforward for one skilled in the art to extend their scheme to eliminate this restriction by using the "table doubling" technique. This technique requires that the table be copied when the number of entries in the table (i.e., the number of buckets) is increased (the cost of copying is amortized over the insertions and deletions as described above).

When we copy the old array into the new array, we need not copy the old array directly into the top half of the new array; we can use any injective mapping (i.e., one in which no two elements map to the same result) from entries in the old array to entries in the new array, copying the bucket pointer from the old array directly into its corresponding entry in the new array. Specifically, if we "interleave" the entries corresponding to buckets in the old array with entries that correspond to new buckets, we can eliminate the need for bit-reversal, as we describe in the next paragraph.

In this new approach, the linked list of nodes containing the elements in the hash table is ordered in increasing (original) hash key order, rather than according to the recursive split-ordering of their hash keys See FIG. 2B). Furthermore, in a bucket array of size $2^N$, the index of the bucket for an element is determined by the N "high-order" bits of its key. Thus, if a key has K bits, then bucket i contains those elements whose keys are in the range $i(2^{K-N})$ to $(i+1)(2^{K-N})-1$. When the number of buckets is increased to $2^{N+1}$, bucket i is split into buckets 2i and 2i+1, where bucket 2i corresponds to bucket i in the old bucket array, and bucket 2i+1 is the new bucket whose "parent" is the old bucket i (now bucket 2i). Upon encountering an uninitialized bucket at an even index 2i, an operation copies the value at index i in the old array. For uninitialized buckets at an odd index 2i+1, the operation initializes the bucket by looking at its "parent" bucket at index 2i in the new array (which corresponds to index i in the old array). No bit reversals are required in this scheme.

For an application in which pre-allocation of an appropriately sized array is possible and it is desirable to avoid copying, we can reduce the cost of bit-reversal by keeping the linked list in increasing hash key order and using the bit-reversed high order bits of the key as the index into the bucket array. This reduces the cost of bit-reversal because fewer bits need to be reversed.

Alternatively, we can use the same no-reversal method described for multiple bucket arrays but use just the originally-allocated array space. In this variation the table is filled sparsely when not many entries are being used, and the spaces "in between" are filled in as the load on the hash table increases. As an example, a table capable of holding 128 entries might be filled with "uninitialized" and then using only two bits to select buckets it would have only the four entries at 0, 32, 64, and 96 filled in with pointers to the start, first quarter, half, and third quarter points of the linked list of data. When the bucket array is "doubled in place", three bits of the hash code would be interpreted as bucket addresses so that the entries at 16, 48, etc. would also be used along with the ones already described.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for indexing a hash table which is organized as a linked list, comprising:
    performing a lookup in the hash table in a computer system memory;
    wherein the hash table is implemented using only one linked list containing data nodes and a bucket array containing bucket pointers, wherein at least one bucket pointer points to a data node that is different from the linked list's head node, and wherein the hash table is resized without re-hashing the data nodes;
    wherein the bucket pointers point to portions of the linked list that function as hash buckets;
    wherein data nodes in the linked list are organized in increasing hash key order rather than bit-reversed hash key order, thereby obviating the need for time-consuming bit-reversal operations;
    wherein performing the lookup involves,
        using a hash key to lookup a bucket pointer in the bucket array, wherein the bucket pointer points to a first data node within the linked list which is different from the linked list's head node, and wherein the bucket pointer is associated with a hash bucket,
        following the bucket pointer to the first data node within the linked list which precedes a second data node, wherein the second data node is within a portion of the linked list that is associated with the hash bucket, and wherein the second data node matches the hash key,
        searching through the linked list starting from the first data node to locate the second data node, and
        returning the second data node to a user.

2. The method of claim 1, wherein using the hash key to look up the bucket pointer involves using the higher-order bits of the hash key as an index into the bucket array to locate the bucket pointer.

3. The method of claim 2, wherein if the average number of data nodes in each bucket exceeds a maximum value, the method further comprises:
    increasing the number of buckets in the bucket array to form a larger bucket array; and
    using additional bits from the hash key to perform lookups in the larger bucket array.

4. The method of claim 3, wherein increasing the number of buckets in the bucket array involves copying the bucket array into the larger bucket array, and in doing so interleaving the bucket array into the larger bucket array.

5. The method of claim 3, wherein increasing the number of buckets in the bucket array involves:
    starting with a sparsely populated bucket array wherein populated entries containing bucket pointers are separated by unused entries; and
    filling unused entries between the populated entries to increase the number of buckets in the bucket array.

6. The method of claim 2, wherein if the average number of data nodes in each bucket falls below a minimum value, the method further comprises:
    reducing the number of buckets in the bucket array to form a smaller bucket array; and
    using fewer bits from the hash key to perform lookups in the smaller bucket array.

7. The method of claim 6, wherein decreasing the number of buckets in the bucket array involves copying the bucket array into the smaller bucket array, and in doing so combining pairs of adjacent buckets from the bucket array to form buckets in the smaller bucket array.

8. The method of claim 1, wherein using the hash key to look up the bucket pointer involves using bit-reversed higher-order bits of the hash key as an index into the bucket array to locate the bucket pointer, whereby benefits of a bit-reversed indexing scheme are obtained without having to reverse all of the bits in the hash key.

9. The method of claim 1, wherein the linked list contains only data nodes and no dummy nodes.

10. The method of claim 1,
    wherein the linked list contains data nodes as well as dummy nodes; and
    wherein each bucket pointer points to a dummy node located at the start of a corresponding hash bucket in the linked list.

11. A computer-readable storage medium storing instructions that when executed by a computer cause the computer to perform a method for indexing a hash table which is organized as a linked list, wherein the computer-readable storage medium is a physical device or medium that can store code and/or data for use by a computer system, the method comprising:
    performing a lookup in the hash table in a computer system memory;

wherein the hash table is implemented using only one linked list containing data nodes and a bucket array containing bucket pointers, wherein at least one bucket pointer points to a data node that is different from the linked list's head node, and wherein the hash table is resized without re-hashing the data nodes;

wherein the bucket pointers point to portions of the linked list that function as hash buckets;

wherein data nodes in the linked list are organized in increasing hash key order rather than bit-reversed hash key order, thereby obviating the need for time-consuming bit-reversal operations;

wherein performing the lookup involves, using a hash key to lookup a bucket pointer in the bucket array, wherein the bucket pointer points to a first data node within the linked list which is different from the linked list's head node, and wherein the bucket pointer is associated with a hash bucket, following the bucket pointer to the first data node within the linked list which precedes a second data node, wherein the second data node is within a portion of the linked list that is associated with the hash bucket, and wherein the second data node matches the hash key, searching through the linked list starting from the first data node to locate the second data node, and returning the second data node to a user.

12. The computer-readable storage medium of claim 11, wherein using the hash key to look up the bucket pointer involves using the higher-order bits of the hash key as an index into the bucket array to locate the bucket pointer.

13. The computer-readable storage medium of claim 12, wherein if the average number of data nodes in each bucket exceeds a maximum value, the method further comprises:

increasing the number of buckets in the bucket array to form a larger bucket array; and using additional bits from the hash key to perform lookups in the larger bucket array.

14. The computer-readable storage medium of claim 13, wherein increasing the number of buckets in the bucket array involves copying the bucket array into the larger bucket array, and in doing so interleaving the bucket array into the larger bucket array.

15. The computer-readable storage medium of claim 13, wherein increasing the number of buckets in the bucket array involves:

starting with a sparsely populated bucket array wherein populated entries containing bucket pointers are separated by unused entries; and filling unused entries between the populated entries to increase the number of buckets in the bucket array.

16. The computer-readable storage medium of claim 12, wherein if the average number of data nodes in each bucket falls below a minimum value, the method further comprises:

reducing the number of buckets in the bucket array to form a smaller bucket array; and using fewer bits from the hash key to perform lookups in the smaller bucket array.

17. The computer-readable storage medium of claim 16, wherein decreasing the number of buckets in the bucket array involves copying the bucket array into the smaller bucket array, and in doing so combining pairs of adjacent buckets from the bucket array to form buckets in the smaller bucket array.

18. The computer-readable storage medium of claim 11, wherein using the hash key to look up the bucket pointer involves using bit-reversed higher-order bits of the hash key as an index into the bucket array to locate the bucket pointer, whereby benefits of a bit-reversed indexing scheme are obtained without having to reverse all of the bits in the hash key.

19. The computer-readable storage medium of claim 11, wherein the linked list contains only data nodes and no dummy nodes.

20. The computer-readable storage medium of claim 11, wherein the linked list contains data nodes as well as dummy nodes; and wherein each bucket pointer points to a dummy node located at the start of a corresponding hash bucket in the linked list.

21. An apparatus that indexes a hash table which is organized as a linked list, comprising:

a lookup mechanism configured to perform a lookup in the hash table in a computer system memory;

wherein the hash table is implemented using only one linked list containing data nodes and a bucket array containing bucket pointers, wherein at least one bucket pointer points to a data node that is different from the linked list's head node, and wherein the hash table is resized without re-hashing the data nodes;

wherein the bucket pointers point to portions of the linked list that function as hash buckets;

wherein data nodes in the linked list are organized in increasing hash key order rather than bit-reversed hash key order, thereby obviating the need for time-consuming bit-reversal operations;

wherein while performing the lookup, the lookup mechanism is configured to, use a hash key to lookup a bucket pointer in the bucket array, wherein the bucket pointer points to a first data node within the linked list which is different from the linked list's head node, and wherein the bucket pointer is associated with a hash bucket, follow the bucket pointer to the first data node within the linked list which precedes a second data node, wherein the second data node is within a portion of the linked list that is associated with the hash bucket, and wherein the second data node matches the hash key, search through the linked list starting from the first data node to locate the second data node, and return the second data node to a user.

22. The apparatus of claim 21, wherein the lookup mechanism is configured to use the higher-order bits of the hash key as an index into the bucket array to locate the bucket pointer.

23. The apparatus of claim 22, further comprising a bucket array expansion mechanism, wherein if the average number of data nodes in each bucket exceeds a maximum value, the bucket array expansion mechanism is configured to:

increase the number of buckets in the bucket array to form a larger bucket array; and to use additional bits from the hash key to perform lookups in the larger bucket array.

24. The apparatus of claim 23, wherein while increasing the number of buckets in the bucket array, the bucket array expansion mechanism is configured to copy the bucket array into the larger bucket array, and in doing so to interleave the bucket array into the larger bucket array.

25. The apparatus of claim 23, wherein while increasing the number of buckets in the bucket array, the bucket array expansion mechanism is configured to:

start with a sparsely populated bucket array wherein populated entries containing bucket pointers are separated by unused entries; and to fill unused entries between the populated entries to increase the number of buckets in the bucket array.

26. The apparatus of claim 23, further comprising a bucket array contraction mechanism, wherein if the average number of data nodes in each bucket falls below a minimum value, the bucket array contraction mechanism is configured to:

reduce the number of buckets in the bucket array to form a smaller bucket array; and to use fewer bits from the hash key to perform lookups in the smaller bucket array.

27. The apparatus of claim 26, wherein while decreasing the number of buckets in the bucket array, the bucket array contraction mechanism is configured to copy the bucket array into the smaller bucket array, and in doing so combining pairs of adjacent buckets from the bucket array to form buckets in the smaller bucket array.

28. The apparatus of claim 21, wherein while using the hash key to look up the bucket pointer, the lookup mechanism is configured to use bit-reversed higher-order bits of the hash key as an index into the bucket array to locate the bucket pointer, whereby benefits of a bit-reversed indexing scheme are obtained without having to reverse all of the bits in the hash key.

29. The apparatus of claim 21, wherein the linked list contains only data nodes and no dummy nodes.

30. The apparatus of claim 21, wherein the linked list contains data nodes as well as dummy nodes; and wherein each bucket pointer points to a dummy node located at the start of a corresponding hash bucket in the linked list.

* * * * *